US011949191B2

(12) United States Patent
Schneider

(10) Patent No.: US 11,949,191 B2
(45) Date of Patent: Apr. 2, 2024

(54) ADAPTER PLUG AND ELECTRONICS MODULE COMPRISING AN ADAPTER PLUG

(71) Applicant: Robert Bosch GmbH, Stuttgart (DE)

(72) Inventor: Claus Schneider, Burgsinn (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 17/404,496

(22) Filed: Aug. 17, 2021

(65) Prior Publication Data

US 2022/0059972 A1 Feb. 24, 2022

(30) Foreign Application Priority Data

Aug. 19, 2020 (DE) ..................... 10 2020 210 496.4

(51) Int. Cl.
*H01R 13/648* (2006.01)
*H01R 13/627* (2006.01)
*H01R 13/631* (2006.01)

(52) U.S. Cl.
CPC ..... *H01R 13/6485* (2013.01); *H01R 13/6273* (2013.01); *H01R 13/6315* (2013.01)

(58) Field of Classification Search
CPC ............ H01R 13/6485; H01R 13/6273; H01R 13/6315; H01R 13/502
USPC .......................................................... 439/246
See application file for complete search history.

(56) References Cited

U.S. PATENT DOCUMENTS

| | | | | |
|---|---|---|---|---|
| 4,909,748 A | | 3/1990 | Kozono et al. | |
| 8,098,326 B2 | * | 1/2012 | Takashima | H04N 23/56 439/246 |
| 10,053,073 B2 | * | 8/2018 | Weh | B60T 8/409 |
| 10,087,961 B2 | * | 10/2018 | Schepp | B60T 15/36 |
| 10,295,068 B2 | * | 5/2019 | Glazewski | F16K 11/027 |
| 2008/0045061 A1 | * | 2/2008 | Hayashi | H05K 5/0052 439/246 |
| 2019/0363491 A1 | * | 11/2019 | Suzuki | H01R 13/187 |

FOREIGN PATENT DOCUMENTS

| | | |
|---|---|---|
| DE | 202 06 391 U1 | 10/2002 |
| DE | 10 2012 100 473 A1 | 7/2013 |
| DE | 10 2018 211 857 A1 | 1/2020 |
| JP | 2005-190720 A | 7/2005 |

* cited by examiner

*Primary Examiner* — Marcus E Harcum
(74) *Attorney, Agent, or Firm* — Maginot, Moore & Beck LLP

(57) ABSTRACT

An adapter plug and an electronics housing includes an adapter plug of this kind, and a valve comprising an electronics housing of this kind. The valve has at least one electric actuator. The adapter plug has at least one receptacle for an actuator-side electrical contact element and a receptacle for an electronics-side electrical contact element. The two receptacles are electrically connected to one another. A main body of the adapter plug is designed for insertion into a recess of a wall portion of the electronics housing, which wall portion faces the actuator. The main body can be fastened to an edge of the recess with tolerance or play so as to be able to compensate for positional deviations of the at least one actuator relative to the electronics housing.

19 Claims, 4 Drawing Sheets

ADAPTER PLUG AND ELECTRONICS MODULE COMPRISING AN ADAPTER PLUG

This application claims priority under 35 U.S.C. § 119 to patent application no. DE 10 2020 210 496.4, filed on Aug. 19, 2020 in Germany, the disclosure of which is incorporated herein by reference in its entirety.

BACKGROUND

The disclosure relates to an adapter plug and to an electronics module comprising an adapter plug of this kind.

Electrically actuated valves, the valve gates of which are accommodated in a valve housing and can be adjusted by two electric actuators which act against one another, are known from the prior art. To this end, an electronics module (OBE), which has control electronics in an electronics housing, is fastened to the hydraulic unit formed by the valve housing and the actuators.

Integrated electronics modules of this kind are connected to the actuators, for example, by means of mounting pliers through blade receptacles. In order to ensure ease of mounting, a correspondingly sufficient line length should be provided, which, once the electronics module and the actuators have been successfully contacted with one another, must be pushed back again into the electronics housing so that the lines are not crushed when the electronics housing is placed in position and fixed, as such a crushing could lead to valve failure and leaks.

In electronics modules according to the prior art, it is usually possible to contact the printed circuit boards by way of the lines that have been led out, which, for example, might lead to damage resulting from electrostatic discharges. In addition, soiling, for example by electrically conductive particles, is possible through the large openings on the electronics housing.

SUMMARY

The object of the disclosure is to create an adapter plug and an electronics module which avoid the above-mentioned disadvantages.

This object is achieved by an adapter plug having the features described below and by an electronics module having the features also described below.

Further advantageous embodiments of the disclosure are described below.

The adapter plug according to the disclosure has at least one actuator-side receptacle for an actuator-side electrical contact element (for example a flat plug) and at least one electronics-side receptacle for an electronics-side electrical contact element (for example a wire end ferrule). The two receptacles are electrically connected to one another. A main body of the adapter plug is designed for insertion into a recess of an actuator-side (in the installed position, lower) wall portion of an electronics housing. The main body can be fastened to an edge of the recess, more specifically with tolerance or play in relation to displacement in the x-direction and/or displacement in the y-direction and/or displacement in the z-direction and/or pivoting about the x-direction and/or pivoting about the y-direction and/or pivoting about the z-direction.

The adapter plug according to the disclosure allows the direct contacting (plug-in) of an integrated electronics module with a hydraulic unit of a valve, which hydraulic unit is formed of a valve housing and the actuator, without the need for any particular know-how, devices and tools. In the event of servicing, the electronics module can also be replaced by technical personnel who have not undertaken any specific training. In this case, positional tolerances, which the at least one actuator-side electrical contact element has relative to the electronics housing, can be compensated for by the tolerance according to the disclosure or the play according to the disclosure.

The main body is preferably insertable into the recess with tolerance or play relative to the edge in relation to all six stated degrees of freedom. Positional deviations in all directions can then be tolerated when the actuator-side contact element comes into contact with the adapter plug and when the electronics housing is fastened to the valve housing in a defined position.

In order to prevent the adapter plug from falling out of the electronics housing before and during the mounting of the electronics housing on the hydraulic unit, a securing means is preferably provided to prevent the adapter plug from being detached from the electronics housing, which securing means can be positioned on an electronics-side (in a usual installation position of the valve, upper) side of the edge. In addition, the adapter plug can be held loosely on the edge following the insertion into the recess. The securing means can be formed from a plurality of snap-action hooks, for example four snap-action hooks, which are integrally molded onto the main body and extend in an x-direction and counter to the x-direction.

In this document, the installation position shall be understood to mean the position of the adapter plug in which the at least one actuator-side contact element is at the bottom and the at least one electronics-side contact element is at the top.

The at least one pair of receptacles can be formed on an electrical connection component. An insulation cover, which is fastened to the main body, is then preferably arranged on the electronics side of the connection component.

The connection component may have a push-in terminal on the electronics side and/or a prong-like spring contact on the actuator side.

A specific exemplary embodiment of an adapter plug has two pairs of receptacles, that is to say two connection components, each with their own insulation cover.

In order to avoid, during operation of the electronics housing, vibrations of the adapter plug positioned with play in the recess, an elastic element acting as a damper is preferably provided on the actuator side, by means of which elastic element the main body can be tensioned in the z-direction (in the installed position, upwardly). The adapter plug thus can be tensioned away from the actuator in the direction of what is referred to as a starting position (in the installed position, the uppermost position).

The tolerance compensation counter to the z-direction (in the installed position, downwardly) is thus provided away from the starting position, preferably by tensioning of the elastic element.

The elastic element can be formed by a spring which extends in the z-direction and has a spring plate. The spring is thus clamped between the (in the installed position, lower) spring plate and a (in the installed position, upper) contact portion which is formed on the main body.

In order to prevent the spring with the spring plate from being lost before or during the mounting of the adapter plug on the electronics housing, the spring plate can have a securing means, which is formed by at least one (for example four) snap-action hook(s), which engages (or engage) the contact portion of the main body from behind.

The spring is preferably arranged centrally in an x-y plane (in the installed position, level) of the adapter plug or its main body. In the exemplary embodiment with the two connection components, the spring is preferably arranged centrally between the two connection components.

In order to prevent contact between the protective conductor (PE) of the actuator and the electronics housing, an insulation for the protective conductor is provided on the main body.

In an exemplary embodiment of the adapter plug according to the disclosure or the electronics module according to the disclosure, the main body has two pairs of ribs, which are arranged opposite one another, extend in the x-direction and counter to the x-direction and are preferably formed integrally on the main body. The recess of the actuator-side wall portion of the electronics housing correspondingly has two pairs of edge portions, which are arranged opposite one another, extend counter to the x-direction and in the x-direction and are preferably formed integrally on the electronics housing. The ribs can be brought into operative connection with an actuator-side (in the installed position, lower) side of the associated edge portion. In the starting position of the adapter plug in the recess, all four ribs are in contact with the actuator-side side of the associated edge portion. In other positions of the adapter plug in the recess, in which positional deviations are compensated for in the manner according to the disclosure, the ribs are each adjacent to the associated edge portion and/or distanced from the associated edge portion to a greater or lesser extent.

In this document, the installed position shall be understood to mean the position of the electronics module in which the at least one recess with the adapter plug is arranged at the bottom.

Alternatively to the aforementioned four ribs with the four edge portions, it is also possible for only two mutually opposed central ribs with only two mutually opposed central edge portions to be provided. These ribs and edge portions are then much larger in the y-direction, that is to say wider, than those of the aforementioned exemplary embodiment. In particular, the ribs can extend over the entire y extent of the main body and/or the edge portions can extend over the entire y extent of the recess. The two ribs and the two edge portions can also be symmetrical with respect to the x axis.

In the exemplary embodiment with the elastic element, the ribs (in the installed position, from the bottom) can be tensioned with respect to the associated edge portions by means of the elastic element.

In the exemplary embodiment with the spring and the spring plate, these are preferably arranged centrally between the ribs.

The tolerance compensation in the x-direction and counter to the x-direction is preferably achieved by sliding one rib of each pair in the direction of the associated edge portion (in the installed position, below the associated edge portion) and by simultaneously pulling out the other rib of the pair in the direction away from the associated edge portion.

The tolerance compensation in the y-direction and counter to the y-direction is preferably achieved by laterally displacing all ribs relative to the associated edge portions.

The tolerance compensation counter to the z-direction is preferably achieved by simultaneously removing (in the installed position, lowering) all ribs from the associated edge portions. Proceeding from the starting position, the ribs are first detached from the two edge portions. The tolerance compensation in the z-direction is achieved correspondingly by simultaneously moving (in the installed position, lifting) all ribs towards the associated edge portions.

The rotary tolerance compensation in the x-direction and counter to the x-direction is preferably achieved by simultaneously removing (in the installed position, lowering) the two ribs of each pair from the associated edge portions. Proceeding from the starting position, the two webs of the pair in question are firstly detached from the associated edge portions.

The rotary tolerance compensation in the y-direction and counter to the y-direction is preferably achieved by removing (in the installed position, lowering) precisely one rib of each pair from the associated edge portion. Proceeding from the starting position, these webs are firstly detached from the associated edge portion.

The rotary tolerance compensation in the z-direction and counter to the z-direction is preferably achieved by pivoting the ribs relative to the associated edge portions. Proceeding from the starting position, the ribs are in this case slid along relative to the associated edge portions.

The electronics module according to the disclosure has an electronics housing, which is designed to be fastened to a hydraulic unit, which has a valve housing and at least one electric actuator. In an actuator-side (in the installed position, lower) wall portion of the electronics housing, there is provided a recess for each actuator, into which recess an adapter plug according to the disclosure is inserted.

The electronics module according to the disclosure allows the direct contacting (“plug-in”) with a hydraulic unit of the valve without the need for any particular know-how, devices and tools. In the event of servicing, the electronics module can also be replaced by technical personnel who have not undertaken any specific training.

The electronics housing can be manufactured from diecast aluminum. The electronics housing can be embodied in two parts with a base facing the actuator and with a further housing part, these being assembled together sealingly.

The electronics module is preferably provided as a unit in a closed electronics housing. This results in ESD (electrostatic discharge) protection. Due to the defined position of the adapter plug, or of the contacts in the electronics module, the electronics module, after completion, can be checked in automated fashion.

A seal for sealing the actuator with respect to the recess of the electronics housing is preferably provided. If the seal is designed as a molded seal running circumferentially around the edge of the recess (in the installed position, below the recess) and only fills out the installation space on the outer edges of the actuator, the spring with the spring plate is preferably used as damper. If, by contrast, a flat seal is used, which fills out the installation space between adapter plug and actuator (in the installed position, beneath the adapter plug), this flat seal is also used as damper.

In a specific exemplary embodiment, the electronics housing of the electronics module according to the disclosure is fastened to the valve housing, to which two actuators acting against one another are also fastened. The two actuators each have a circular-cylindrical actuator housing, which extends in or counter to the x-direction. Two flat plugs extend in the z-direction (in the installed position, upwardly) at the outer circumference of each actuator housing. The electronics housing has, adjacently to each actuator housing, a recess with an adapter plug according to the disclosure. The two flat plugs are plugged into the adapter plug. A valve is thus formed which has increased security against falling out, since it can be easily plugged together, while at the same time the above-mentioned problems regarding crushing of the lines and infiltration of foreign bodies into the electronics housing are avoided. In addition, it is possible to compensate for positional deviations, for example of the two flat plugs of each actuator relative to the electronics housing resulting from the tolerance or the play.

BRIEF DESCRIPTION OF THE DRAWINGS

An exemplary embodiment of an adapter plug according to the disclosure and of an electronics module according to the disclosure is shown in the figures.

In the figures.

DETAILED DESCRIPTION

Figure 1:
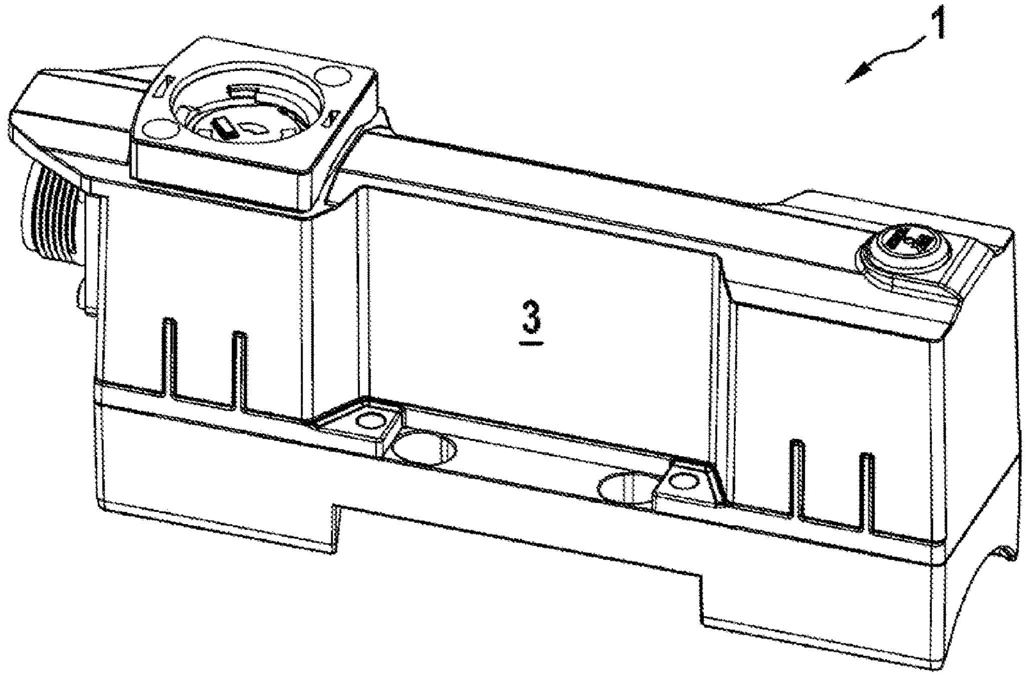
FIG. 1 shows a perspective illustration of the electronics module according to the disclosure.

FIG. 1 shows a perspective illustration of the electronics module 1 according to the disclosure. The electronics module 1 is configured for use with a hydraulic unit 2 (see FIG. 2).

The electronics module 1, together with a hydraulic unit 2, forms an electrically actuated 4/3-way valve, the valve gate of which (not shown) is received in an approximately cuboidal valve housing 4 and is displaceable by two electric actuators 6 acting against one another. The actuators 6 have circular-cylindrical housings, the outer circumference of which in each case has a base arranged on it on the side facing the electronics module 1. Two flat plugs 10 are provided on each base and extend in the direction of the electronics housing 3.

Figure 3:
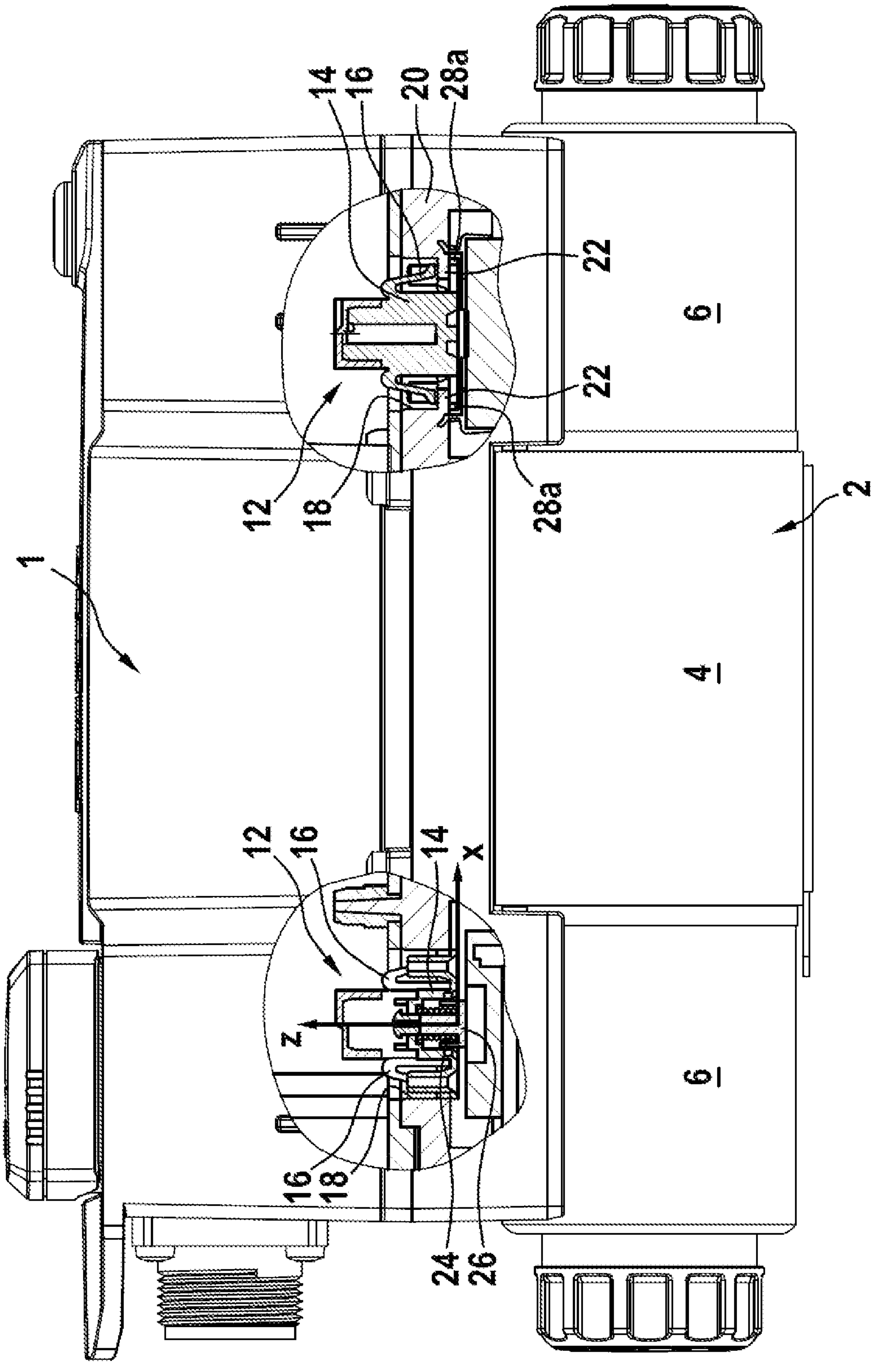
FIG. 3 shows an illustration from the side of the electronics module according to the disclosure from FIG. 1 with two adapter plugs according to the disclosure in accordance with the exemplary embodiment together with the hydraulic unit according to the disclosure from FIG. 2.

FIG. 3 shows a partly sectional view from the side of the electronics module 1 according to the disclosure from FIG. 1 with two adapter plugs 12 according to the disclosure together with the hydraulic unit 2.

Figure 2:
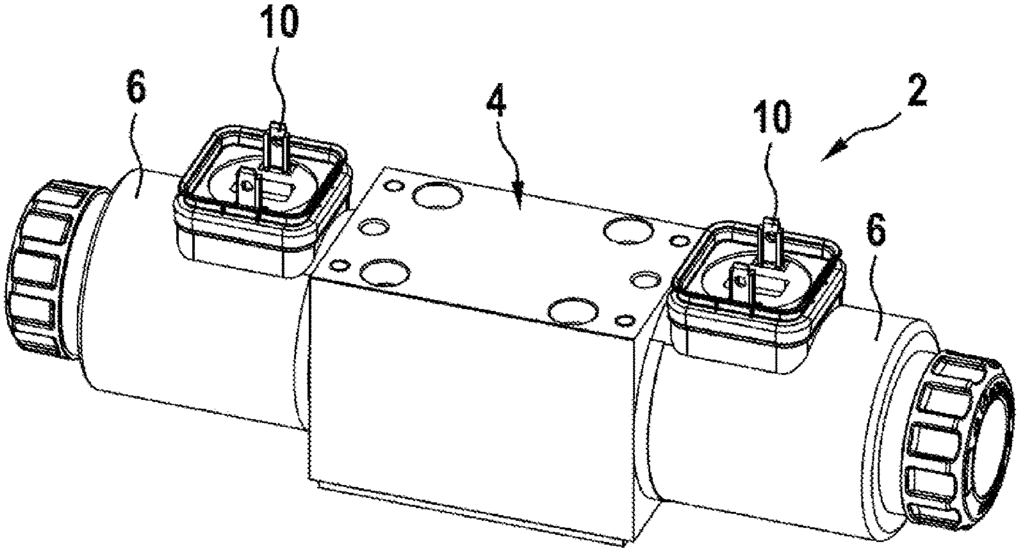
FIG. 2 shows a perspective illustration of the hydraulic unit according to the disclosure.

Each adapter plug 12 is associated with an actuator 6 or one of its bases or two flat plugs 10 thereof (see FIG. 2). Each adapter plug 12 receives two flat plugs 10 and connects them to two lines (not shown), which are connected to printed circuit boards (not shown) of the electronics module 1.

In each of the two recesses 18 of a base 20 of the electronics housing 3, there are arranged two pairs of mutually opposed edge portions 22, which extend in the direction of the adapter plug 12 or its main body 14. In the right-hand recess 18 in FIG. 3, a pair of these edge portions 22 can be seen. A fastening with play and tolerance and additionally also a securing means of the main body 14 acts on this total of two pairs of edge portions 22.

The securing means of each main body 14 has four leg-like snap-in hooks 16 formed opposite one another in pairs, wherein only one pair of snap-in hooks 16 is shown at each of the adapter plugs 12 shown in section in FIG. 3.

In the adapter plug 12 shown on the left in FIG. 3, it can be seen that a damper is arranged centrally between the four snap-in hooks 16 and is formed by a spring 24 and a spring plate 26. The spring 24 is clamped between the spring plate 26 and a contact region of the main body 14. The spring 24 is supported via the spring plate 26 on the base of the actuator 6 and tensions the adapter plug 12 over its main body 14 in the z-direction (upwardly in FIG. 3).

Figure 4:
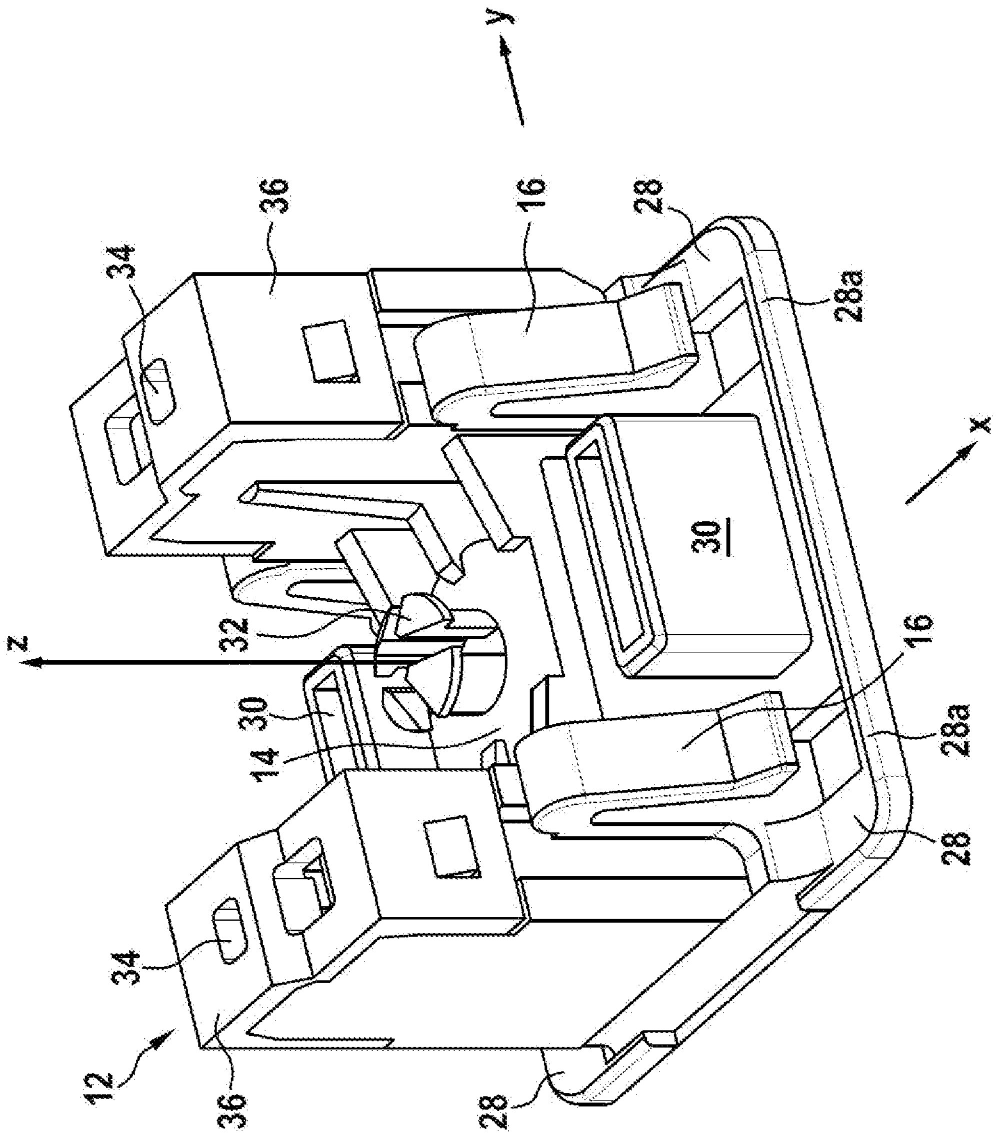
FIG. 4 shows a perspective illustration of the adapter plug according to the disclosure from the previous figures.

FIG. 4 shows a perspective view of the adapter plug 12 according to the disclosure from FIG. 3. Pairs of ribs 28 formed integrally on the main body 14 extend in the x-direction or counter to the x-direction below the two pairs of edge portions 22 of each recess 18 (from FIG. 3). In the shown exemplary embodiment, the four ribs 28 also have the support ribs 28*a* extending in the y-direction or counter to the y-direction.

In FIG. 3, the two adapter plugs 12 are shown in each case in their uppermost position, or what is known as the starting position. In this starting position, the adapter plugs 12 are tensioned by the springs 24 (only visible at the left adapter plug 12). In this starting position, the ribs 28 and the connection ribs 28*a* bear against the actuator-side sides of the associated edge portions 22. In FIG. 3, two connection ribs 28*a* can be seen only at the right-hand adapter plug 12.

Again, with reference to FIG. 4, it can be seen that an insulation 30 is provided in the y-direction between two connection ribs 28*a* for a protective conductor (not shown) running therein. It is thus ensured that, during the mounting process and in operation, there is no accidental contact between the protective conductor received therein and the electronics housing 3 if the latter is fabricated electrically conductively, for example from die-cast aluminum.

The regions in which a particular edge portion 22 of the recess 18 of the base of the electronics housing 3 is inserted with play can be seen in the y-direction in front of and behind the insulation 30 clearly visible in FIG. 4. A snap-action hook 16 is thus arranged above each edge portion 22, and a rib 28 and connection web (i.e. a support rib 28*a*) are arranged beneath each edge portion 22.

Furthermore, a securing means for the damper is shown centrally on the adapter plug 12 with respect to an X-Y plane, which damper consists of four snap-action hooks 32, which will be explained in greater detail with reference to FIG. 5.

The shown adapter plug 12 (in the installed position, at the top) is contacted with the electronics of the electronics module 1 by means of the two insertion openings 34, which are formed in respective insulation covers 36. Both insulation covers 36 are distanced from one another in the y-direction and are rotated relative to one another through 180 degrees and are fastened to the main body 14 by snap-action connection.

For example, the two adapter plugs 12 can firstly be inserted with play in a base of the electronics housing 3, then the electronics accommodated in the main portion of the electronics housing 3 can be connected by means of lines and the insertion openings 34 to the two adapter plugs 12. The main portion and the base of the electronics housing 3 can then be connected to one another sealingly. The electronics module 1 is thus created as intermediate product and lastly can be placed easily onto the flat plugs 10 of the actuators 6 (see FIG. 3).

Figure 5:
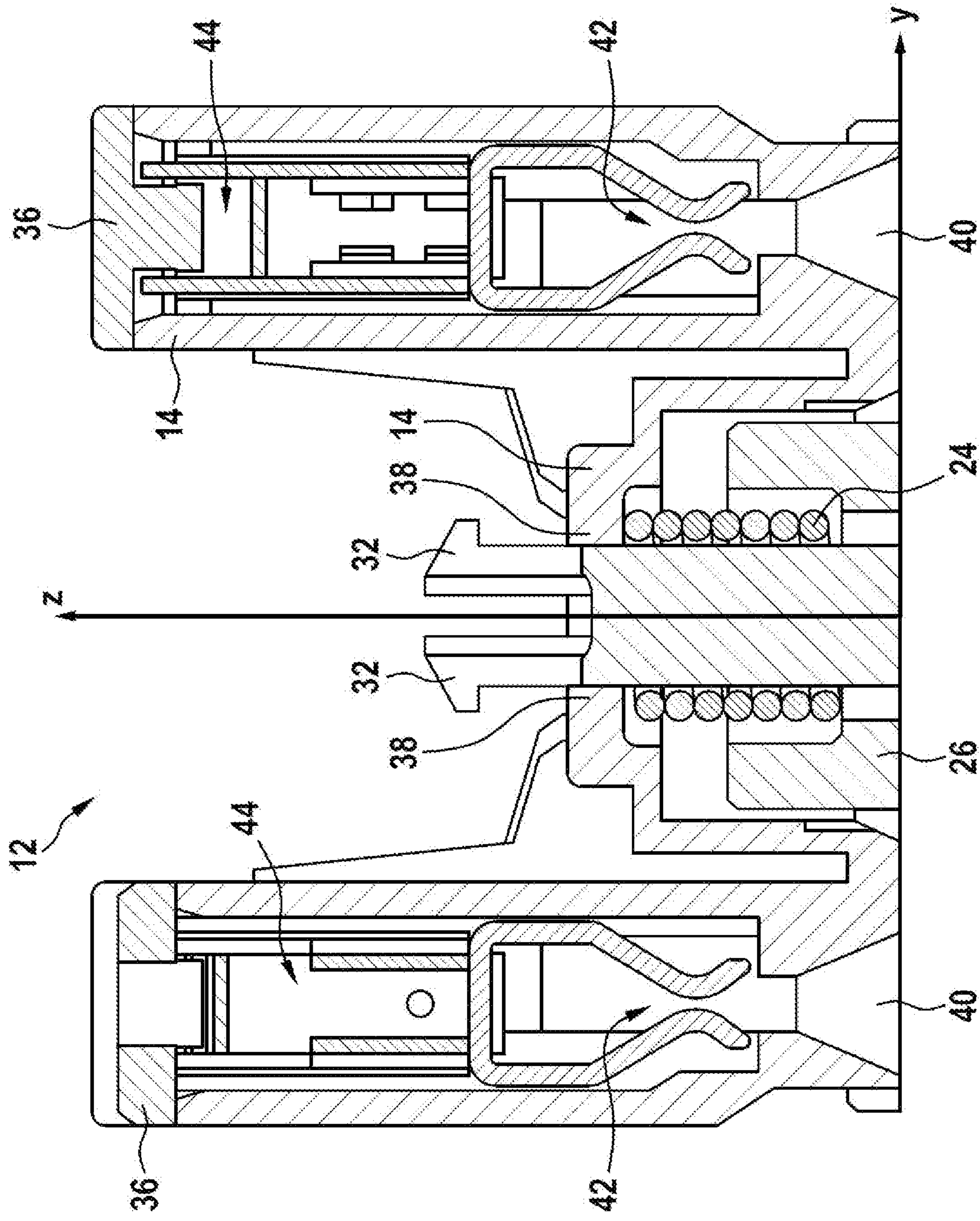
FIG. 5 shows a sectional illustration of the adapter plug according to the disclosure from the previous figures.

FIG. 5 shows a sectional view of the adapter plug 12 according to the disclosure from the previous figures.

From the spring plate 26, there extends integrally in the z-direction a cylindrical guide body for the spring 24, and at the guide body end portion remote from the spring plate 26 (in the installed position, the upper end portion) there are formed integrally the four snap-action hooks 32, which engage behind the contact portion 38 of the main body 14, which contact portion is designed for the spring 24. The damper thus formed is thus prevented from being able to detach from the main body 14.

Insertion bevels 40 for the flat plugs 10 are provided in pairs on the side of the main body 14 facing the actuator 6 (in the installed position, the lower side). The flat plugs 10 are then introduced into symmetrical prong-like spring contacts 42.

The spring contacts 42 are formed together with push-in terminals 44 on metallic connection components, which are inserted into the main body 14 and, similarly to the insulation covers 36, are rotated relative to one another through 180 degrees.

An adapter plug and an electronics module comprising an adapter plug of this kind, and a valve comprising an electronics module of this kind are disclosed. The valve has at least one electric actuator. The adapter plug has a pair of receptacles for a pair of actuator-side electrical contact elements and a pair of receptacles for a pair of electronics-side electrical contact elements. A main body of the adapter plug is designed for insertion into a recess of a wall portion of the electronics housing, which wall portion faces the actuator. The main body can be fastened to an edge of the recess with tolerance or play so as to be able to compensate for positional deviations of the at least one actuator relative to the electronics housing.

LIST OF REFERENCE SIGNS

1 electronics module
2 hydraulic unit
3 electronics housing
4 valve housing
6 actuator
10 actuator-side contact element/flat plug
12 adapter plug
14 main body
16 securing means/snap-action hook
18 recess
20 base
22 edge portion
24 spring
26 spring plate
28 rib
28*a* support rib
30 insulation
32 snap-action hook
34 insertion opening
36 insulation cover
38 contact portion
40 insertion bevel
42 actuator-side receptacle/spring contact
44 electronic-side receptacle/push-in terminal

What is claimed is:

1. An electronics module, comprising:

an electronics housing configured to fasten to a hydraulic unit which has a valve housing and at least one electric actuator, wherein at least one recess is provided in an actuator-side wall portion of the electronics housing; and an adapter plug configured to be inserted into the at least one recess, the adapter plug comprising:

a main body;

at least one actuator-side receptacle for at least one actuator-side electrical contact element; and at least one electronics-side receptacle for at least one electronics-side electrical contact element, wherein the at least one actuator-side receptacle and the at least one electronics-side receptacle are electrically connected to one another, the main body is configured for insertion into a recess of the actuator-side wall portion of the electronics housing, and the main body is further configured to be inserted into the recess with tolerance or play relative to an edge of the recess in relation to displacement in the x-direction and/or displacement in the y-direction and/or displacement in the z-direction and/or pivoting about the x-direction and/or pivoting about the y-direction and/or pivoting about the z-direction and can be fastened to the edge.

2. The electronics module according to claim 1, the adapter plug further comprising a securing mechanism configured to hold the adapter plug loosely on the edge.

3. The electronics module according to claim 1, the adapter plug further comprising an insulation cover fastened to the main body, wherein:

the at least one actuator-side receptacle and the at least one electronics-side receptacle are defined by a body formed on an electrical connection component, and the insulation cover is arranged on an electronics side of the electrical connection component.

4. The electronics module according to claim 1, the adapter plug further comprising an elastic element provided on an actuator side, wherein the elastic element is configured to act as a damper in order to tension the main body in the z-direction.

5. The electronics module according to claim 4, wherein:

a first tolerance compensation by displacement in the z-direction is achieved by relaxation of the elastic element, and a second tolerance compensation by displacement counter to the z-direction is achieved by tensioning of the elastic element.

6. The electronics module according to claim 4, wherein the elastic element includes a spring with a spring plate.

7. The electronics module according to claim 5, wherein:

the main body has two pairs of ribs which are arranged opposite one another and extend in the x-direction and counter to the x-direction, the recess has two pairs of edge portions which are arranged opposite one another and extend counter to the x-direction and in the x-direction, and the ribs are configured to be brought into contact with an actuator-side side of the associated edge portion.

8. The electronics module according to claim 7, wherein the ribs are further configured to be tensioned against the associated edge portion by way of the elastic element.

9. The electronics module according to claim 7, wherein the tolerance compensation in the x-direction and counter to the x-direction is achieved by sliding one rib of each pair in the direction of the associated edge portion and by simultaneously pulling the other rib of the pair in the direction away from the associated edge portion.

10. The electronics module according to claim 8, wherein the tolerance compensation in the y-direction and counter to the y-direction is achieved by laterally displacing the ribs relative to the associated edge portions.

11. The electronics module according to claim 7, wherein:

the tolerance compensation in the z-direction is achieved by simultaneously moving the ribs of both pairs towards the associated edge portions, and the tolerance compensation counter to the z-direction is achieved by simultaneously removing the ribs of both pairs from the associated edge portions.

12. The electronics module according to claim 7, wherein the rotary tolerance compensation in the x-direction and counter to the x-direction is achieved by simultaneously removing the two ribs of precisely one pair from the associated edge portions.

13. The electronics module according to claim 7, wherein the rotary tolerance compensation in the y-direction and counter to the y-direction is achieved by removing precisely one rib of each of the two pairs from the associated edge portion.

14. The electronics module according to claim 7, wherein the rotary tolerance compensation in the z-direction and counter to the z-direction is achieved by pivoting the ribs relative to the associated edge portions.

15. The electronics module according to claim 9, wherein the tolerance compensation in the y-direction and counter to the y-direction is achieved by laterally displacing the ribs relative to the associated edge portions.

16. An adapter plug, comprising:

a main body;

at least one actuator-side receptacle for at least one actuator-side electrical contact element; and at least one electronics-side receptacle for at least one electronics-side electrical contact element, wherein the at least one actuator-side receptacle and the at least one electronics-side receptacle are electrically connected to one another, the main body is configured for insertion into a recess of an actuator-side wall portion of an electronics housing, the main body is further configured to be inserted into the recess with tolerance or play relative to an edge of the recess in relation to displacement in the x-direction and/or displacement in the y-direction and/or displacement in the z-direction and/or pivoting about the x-direction and/or pivoting about the y-direction and/or pivoting about the z-direction and can be fastened to the edge, an elastic element is provided on an actuator side, the elastic element is configured to act as a damper in order to tension the main body in the z-direction, a first tolerance compensation by displacement in the z-direction is achieved by relaxation of the elastic element, a second tolerance compensation by displacement counter to the z-direction is achieved by tensioning of the elastic element, the main body has two pairs of ribs which are arranged opposite one another and extend in the x-direction and counter to the x-direction, the recess has two pairs of edge portions which are arranged opposite one another and extend counter to the x-direction and in the x-direction, and the ribs are configured to be brought into contact with an actuator-side side of the associated edge portion.

17. The adapter plug according to claim 16, wherein the ribs are further configured to be tensioned against the associated edge portion by way of the elastic element.

18. The adapter plug according to claim 16, wherein the tolerance compensation in the x-direction and counter to the x-direction is achieved by sliding one rib of each pair in the direction of the associated edge portion and by simultaneously pulling the other rib of the pair in the direction away from the associated edge portion.

19. The adapter plug according to claim 17, wherein the tolerance compensation in the y-direction and counter to the y-direction is achieved by laterally displacing the ribs relative to the associated edge portions.

* * * * *